(12) United States Patent
Chen et al.

(10) Patent No.: US 12,513,470 B2
(45) Date of Patent: Dec. 30, 2025

(54) PIEZOELECTRIC MEMS MICROPHONE WITH SPRING REGION

(71) Applicant: SKYWORKS SOLUTIONS, INC., Irvine, CA (US)

(72) Inventors: Guofeng Chen, Fremont, CA (US); You Qian, Singapore (SG); Rakesh Kumar, Singapore (SG); Michael Jon Wurtz, Lake Oswego, OR (US); Humberto Campanella-Pineda, Singapore (SG)

(73) Assignee: SKYWORKS SOLUTIONS, INC., Irvine, CA (US)

(*) Notice: Subject to any disclaimer, the term of this patent is extended or adjusted under 35 U.S.C. 154(b) by 452 days.

(21) Appl. No.: 17/937,834

(22) Filed: Oct. 4, 2022

(65) Prior Publication Data
US 2023/0105699 A1 Apr. 6, 2023

Related U.S. Application Data

(60) Provisional application No. 63/252,260, filed on Oct. 5, 2021.

(51) Int. Cl.
H04R 17/02 (2006.01)
B81B 3/00 (2006.01)
(Continued)

(52) U.S. Cl.
CPC ........... *H04R 17/02* (2013.01); *B81B 3/0021* (2013.01); *B81C 1/00182* (2013.01);
(Continued)

(58) Field of Classification Search
CPC .............. B81B 3/0021; B81B 1/00182; B81B 2201/0257; B81B 2203/0127;
(Continued)

(56) References Cited

U.S. PATENT DOCUMENTS 8,948,419 B2 * 2/2015 Zhang .................... H04R 19/04
381/174
9,055,372 B2 6/2015 Grosh et al.
(Continued)

FOREIGN PATENT DOCUMENTS

EP 3557881 A1 10/2019
JP 2008118639 A 5/2008
(Continued)

OTHER PUBLICATIONS

Translation of CN 107128870A (Year: 2017).*
(Continued)

*Primary Examiner* — Brian Ensey
(74) *Attorney, Agent, or Firm* — Lando & Anastasi, LLP

(57) ABSTRACT

A piezoelectric microelectromechanical systems microphone is provided comprising a substrate including at least one wall defining a cavity, the at least one wall defining an anchor region around a perimeter, a piezoelectric film layer forming a membrane, the piezoelectric film layer being supported at the anchor region by a spring region, and an electrode disposed over the piezoelectric film layer. A method of manufacturing such a MEMS microphone is also provided.

17 Claims, 15 Drawing Sheets

(51) Int. Cl.
*B81C 1/00* (2006.01)
*H04R 31/00* (2006.01)
*H10N 30/30* (2023.01)

(52) U.S. Cl.
CPC .......... *H04R 31/00* (2013.01); *H10N 30/308* (2023.02); *B81B 2201/0257* (2013.01); *B81B 2203/0127* (2013.01); *B81B 2203/0163* (2013.01); *B81B 2203/0307* (2013.01); *B81B 2203/0315* (2013.01); *B81B 2203/04* (2013.01); *B81C 2201/0132* (2013.01); *B81C 2201/016* (2013.01); *B81C 2201/017* (2013.01); *B81C 2201/0176* (2013.01); *H04R 2201/003* (2013.01)

(58) Field of Classification Search
CPC .... B81B 2203/0163; B81B 2203/0307; B81B 2203/0315; B81B 2203/04; B81B 3/0072; B81C 2201/0132; B81C 2201/016; B81C 2201/017; B81C 2201/0176; H04R 1/04; H04R 7/20; H04R 17/02; H04R 31/00; H04R 2201/003; H04R 31/003; H04R 31/006; H10N 30/308
See application file for complete search history.

(56) References Cited

U.S. PATENT DOCUMENTS

| | | | |
|---|---|---|---|
| 9,832,573 B2* | 11/2017 | Hall | H04R 23/006 |
| 10,626,007 B2 | 4/2020 | Bretthauer et al. | |
| 10,964,880 B2 | 3/2021 | Grosh et al. | |
| 2008/0123878 A1 | 5/2008 | Zhe et al. | |
| 2009/0092273 A1 | 4/2009 | Zhe et al. | |
| 2011/0051985 A1 | 3/2011 | Hwang et al. | |
| 2013/0121509 A1 | 5/2013 | Hsu et al. | |
| 2016/0219374 A1 | 7/2016 | Hall et al. | |
| 2016/0219375 A1 | 7/2016 | Hall et al. | |
| 2017/0085994 A1 | 3/2017 | Clerici et al. | |
| 2017/0186940 A1 | 6/2017 | Bevilacqua et al. | |
| 2018/0091905 A1 | 3/2018 | Clerici et al. | |
| 2018/0299335 A1 | 10/2018 | Wong et al. | |
| 2019/0281393 A1 | 9/2019 | Grosh et al. | |
| 2019/0327562 A1* | 10/2019 | Cerini | H04R 17/02 |
| 2020/0148532 A1 | 5/2020 | Grosh et al. | |
| 2020/0351595 A1 | 11/2020 | Rusconi Clerici Beltrami et al. | |
| 2020/0382876 A1 | 12/2020 | Cerini et al. | |
| 2021/0051413 A1 | 2/2021 | Hui et al. | |
| 2021/0084423 A1 | 3/2021 | Rusconi Clerici Beltrami et al. | |
| 2021/0120346 A1 | 4/2021 | Hui et al. | |
| 2021/0136483 A1 | 5/2021 | Hsieh et al. | |
| 2021/0385584 A1 | 12/2021 | Goswami et al. | |
| 2022/0073342 A1 | 3/2022 | Ho et al. | |
| 2022/0267141 A1 | 8/2022 | Chen et al. | |
| 2022/0272459 A1 | 8/2022 | Chen et al. | |
| 2022/0332568 A1 | 10/2022 | Barsukou | |
| 2022/0402752 A1 | 12/2022 | Goswami et al. | |
| 2023/0007405 A1 | 1/2023 | Qian et al. | |
| 2023/0011561 A1 | 1/2023 | Qian et al. | |
| 2023/0012046 A1 | 1/2023 | Qian et al. | |
| 2023/0039743 A1 | 2/2023 | Hui et al. | |
| 2023/0072672 A1 | 3/2023 | Chen et al. | |
| 2023/0104257 A1 | 4/2023 | Barsukou et al. | |
| 2023/0127983 A1 | 4/2023 | Chen et al. | |
| 2023/0188896 A1 | 6/2023 | Barsukou | |
| 2023/0234837 A1 | 7/2023 | Chen et al. | |
| 2023/0239641 A1 | 7/2023 | Chen et al. | |
| 2023/0303387 A1 | 9/2023 | Barsukou | |
| 2024/0098426 A1 | 3/2024 | Barsukou | |

FOREIGN PATENT DOCUMENTS

| | | |
|---|---|---|
| JP | 2019140638 A | 8/2019 |
| KR | 101058475 B1 | 8/2011 |

OTHER PUBLICATIONS

Je et al., "In situ tuning of a MEMS microphone using electrodeposited nanostructures," Journal of Micromechanics and Microengineering, 19 (2009) 035015, pp. 1-8.

Je et al., "MEMS Capacitive Microphone with Dual-Anchored Membrane", Proceedings 2017, 1, 342; Aug. 9, 2017.

Knisely et al., "Method for Controlling Stress Gradients in PVD Aluminum Nitride", Journal of Micromechanics and Microengineering, vol. 28, No. 11, 2018.

Lo et al., "Development of a No-Back-Plate SOI MEMS Condenser Microphone," IEEE, Transducers 2015, Anchorage, Alaska, Jun. 21-25, 2015, pp. 1085-1088.

Lo et al., "Sensitivity Improvement of No-Back-Plate MEMS Microphone Using Polysilicon Trench-refilled Process," IEEE, Transducers 2017, Kaohsiung, Taiwan, Jun. 18-22, 2017, pp. 1171-1174.

Mohamad et al., "Modelling and Optimisation of a Spring-Supported Diaphragm Capacitive MEMS Microphone", Engineering, 2010, 2, 762-770.

Pulskamp et al. "Mitigation of residual film stress deformation in multilayer microelectromechanical systems cantilever devices." Journal of Vacuum Science & Technology B: Microelectronics and Nanometer Structures Processing, Measurement, and Phenomena 21.6 (2003): 2482-2486.

Segovia-Fernandez et al., "Monolithic Piezoelectric Aluminum Nitride MEMS-CMOS Microphone", IEEE (2017), Transducers 2017, Kaohsiung, TAIWAN, Jun. 18-22, 2017, pp. 414-417.

Shah et al., "Design Approaches of MEMS Microphones for Enhanced Performance", Hindawi, Journal of Sensors, vol. 2019, Article ID 9294528, Mar. 6, 2019, 26 pages.

Yamashita et al., "Diaphragm deflection control of piezoelectric ultrasonic microsensors for sensitivity improvement", Sensors and Actuators A 139 (2007), pp. 118-123.

Chen et al. "Acoustic Transducers Built on Edge-released MEMS Structures," Solid-State Sensors, Actuators, and Microsystems Workshop Hilton Head Island, South Carolina, Jun. 6-10, 2010, pp. 234-237.

Chen et al., "Edge-released, piezoelectric MEMS acoustic transducers in array configuration," J. Micromech. Microeng. 22 (2012) 025005, pp. 1-9.

Huang et al., "High Sensitivity and High S/N Microphone Achieved by PZT Film with Central-Circle Electrode Design", IEEE, MEMS 2017, Las Vegas, NV, USA, Jan. 22-26, 2017, pp. 1188-1191.

Littrell, "High Performance Piezoelectric MEMS Microphones", PhD dissertation (2010).

Peña-García et al., "Design and Modeling of a MEMS Dual-Backplate Capacitive Microphone with Spring-Supported Diaphragm for Mobile Device Applications," Sensors (2018), 18, 3545, 30 pages.

Udvardi et al., Spiral-Shaped Piezoelectric MEMS Cantilever Array for Fully Implantable Hearing Systems. Micromachines (2017) 8, 311, 13 pages.

Williams et al., "An AlN MEMS Piezoelectric Microphone for Aeroacoustic Applications," Journal of Microelectromechanical Systems, vol. 21, No. 2, Apr. 2012, pp. 270-283.

Yan et al., "Corrugated Diaphragm for Piezoelectric Microphone," IEEE (1996), pp. 503-506.

* cited by examiner

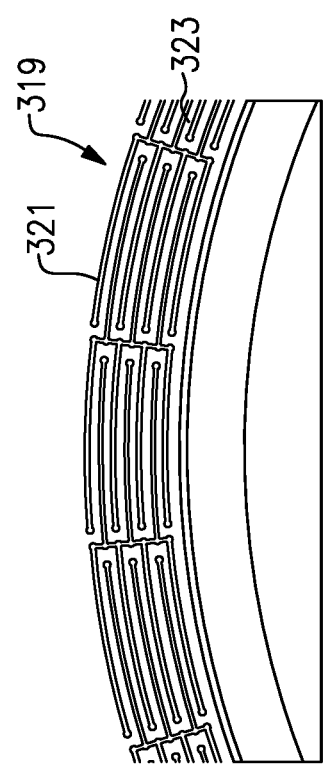
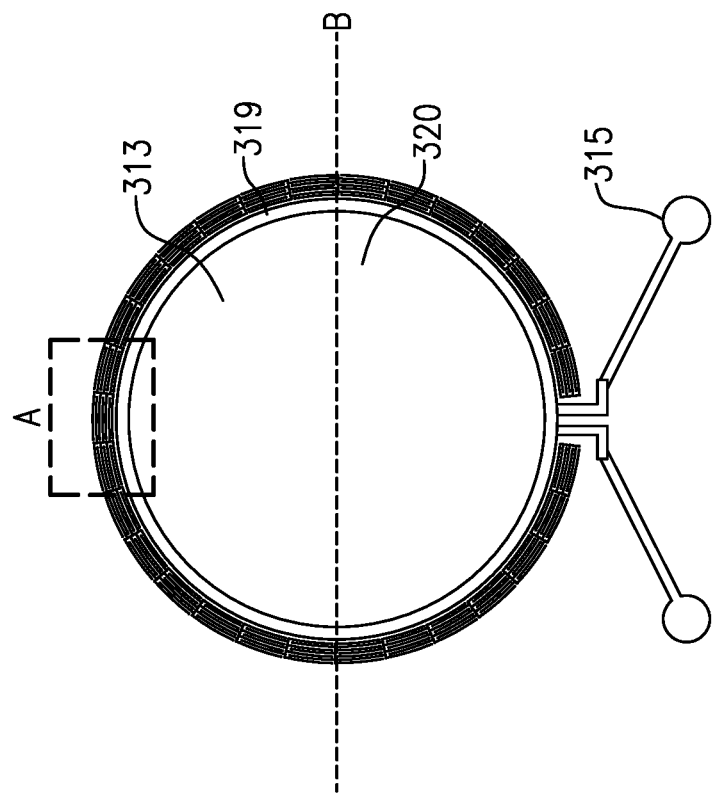
FIG.3B
FIG.3A

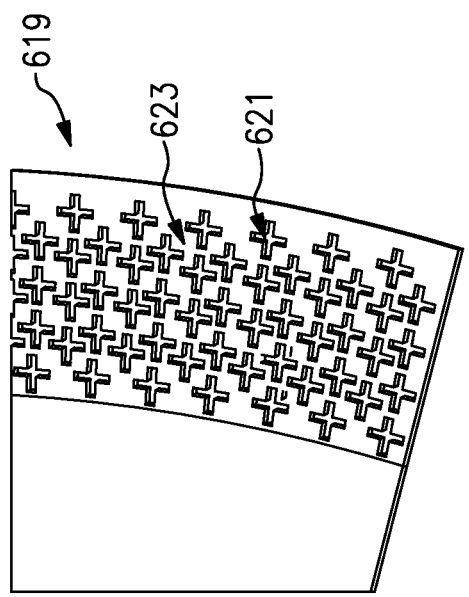
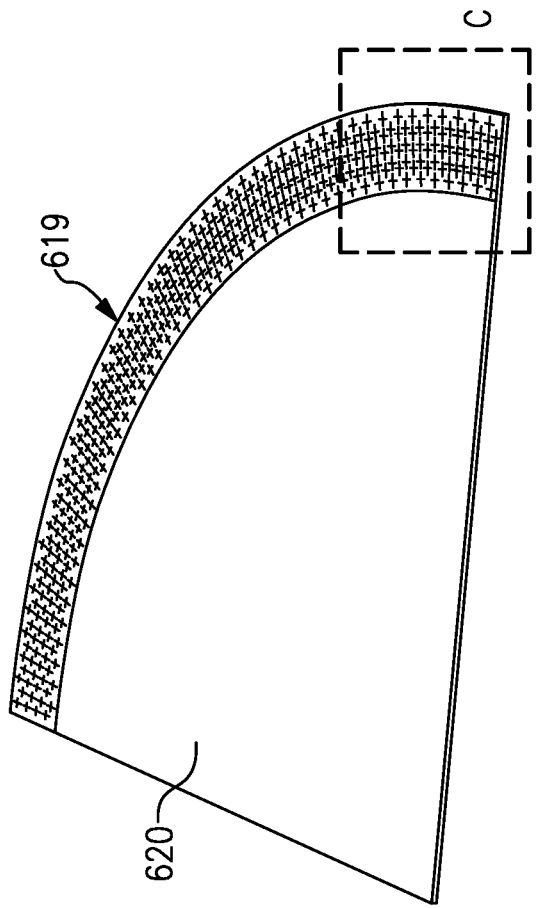
FIG.6B
FIG.6A

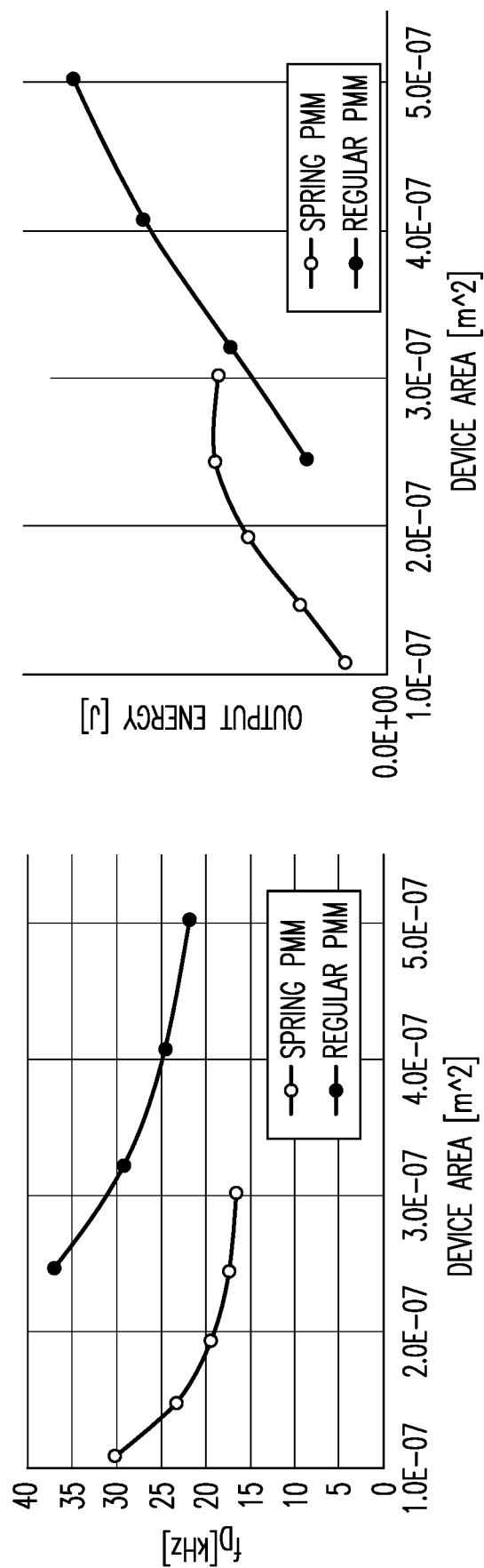

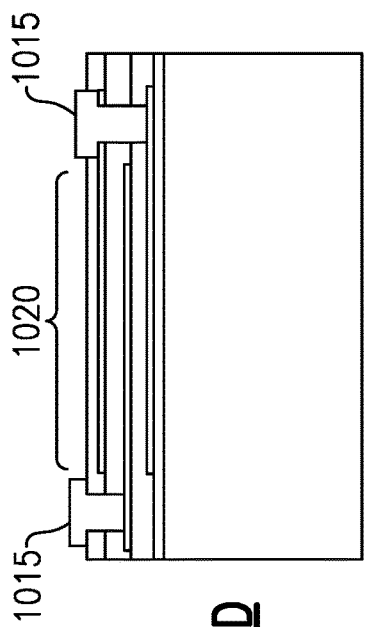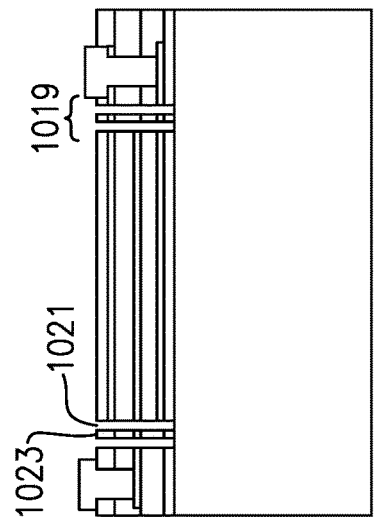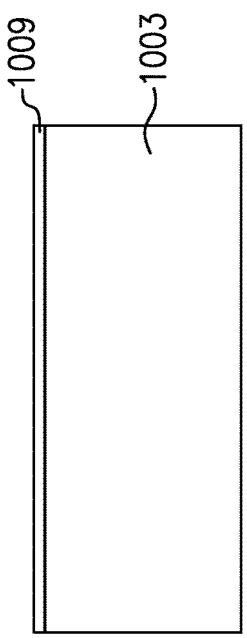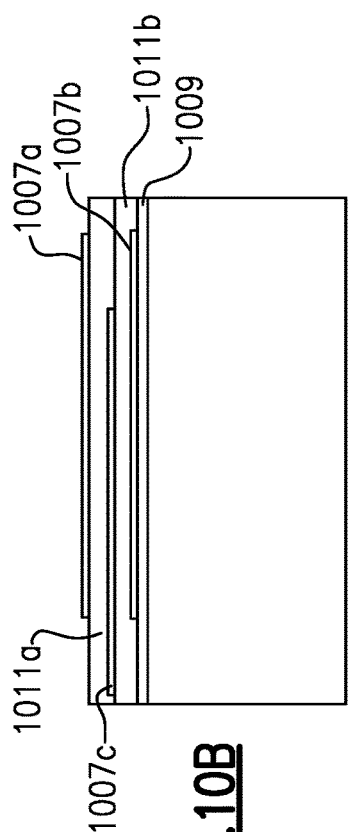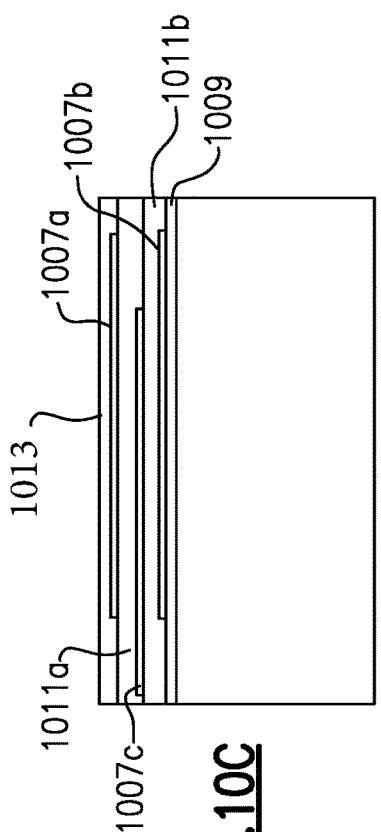

PIEZOELECTRIC MEMS MICROPHONE WITH SPRING REGION

CROSS-REFERENCE TO RELATED APPLICATIONS

This application claims priority under 35 U.S.C. § 119(e) to U.S. Provisional Patent Application Ser. No. 63/252,260, titled "PIEZOELECTRIC MEMS MICROPHONE WITH SPRING REGION," filed Oct. 5, 2021, the entire contents of which is incorporated herein by reference in its entirety for all purposes.

BACKGROUND

Field

The present disclosure relates to a piezoelectric microelectromechanical systems (MEMS) microphone, and in particular a piezoelectric MEMS microphone with a membrane.

Description of the Related Technology

A MEMS microphone is a micro-machined electromechanical device used to convert sound pressure (e.g., voice sound) to an electrical signal (e.g., voltage). MEMS microphones are widely used in mobile devices, headsets, smart speakers, and other voice-interface devices or systems. Conventional capacitive MEMS microphones suffer from high power consumption (e.g., large bias voltage) and reliability, for example, when used in a harsh environment (e.g., when exposed to dust and/or water).

Piezoelectric MEMS microphones have been used to address the deficiencies of capacitive MEMS microphones. Piezoelectric MEMS microphones offer a constant listening capability while consuming almost no power (e.g., no bias voltage is needed), are robust and immune to water and dust contamination.

Piezoelectric MEMS microphones work on the principle of piezoelectric effect, so that they convert acoustic signals to electric signals when sound waves vibrate the piezoelectric sensor. The sound waves bend the piezoelectric film layers of a membrane or cantilevered beam, causing stress and strain, resulting in charges being generated in the piezoelectric film layers. The charges are converted to voltage as an output signal that is sensed by one or more electrodes on the piezoelectric film layers.

SUMMARY

According to one embodiment, there is provided a piezoelectric microelectromechanical systems microphone. The piezoelectric microelectromechanical systems microphone comprises a substrate including at least one wall defining a cavity, the at least one wall defining an anchor region around a perimeter, a piezoelectric film layer forming a membrane, the piezoelectric film layer being supported at the anchor region by a spring region, an electrode disposed over the piezoelectric film layer.

In one example, the spring region is formed from the membrane. This has the advantage that the formation of the spring region is simple.

In one example, the spring region is formed from a metal. This has the advantage that metal is soft, and therefore a metal spring region increases the freedom of the membrane.

In one example, the spring region is formed from a piezoelectric material.

In one example, the spring region is formed from the piezoelectric film layer. This has the advantage that the spring region may be formed in the same steps as the piezoelectric film layer for the membrane.

In one example, the spring arrangement comprises at least two slits and at least one join. This has the advantage that the slits provide more freedom for the membrane.

In one example, the at least two slits are polygonal. In one example, the at least two slits are cross shaped. In one example, the spring region comprises a plurality of zig zag portions. The spring region may be designed to be any design which is advantageous to the specific device.

In one example, the microphone further comprises a passivation layer. This protects the membrane from damage due to the external environment.

In one example, the spring region is adjacent the anchor region of the piezoelectric membrane. This has the advantage that the membrane is freer to move, and thus has less stress.

In one example, the membrane is circular.

In one example, the microphone has a second and third electrode. This has the advantage that there is a positive, a negative, and a ground electrode.

In one example, the microphone has a second piezoelectric film layer. This has the advantage that the membrane may have alternating layers of piezoelectric film layers and electrode layers.

According to one embodiment there is provided a method of forming a piezoelectric microelectromechanical systems microphone. The method comprises depositing a piezoelectric film layer on a substrate to define a membrane, forming a spring region, and etching the substrate to define a cavity.

In one example, the method further comprises depositing a second piezoelectric film layer.

In one example, the method further comprises depositing a passivation layer.

In one example, the method further comprises forming a spring region includes etching the membrane.

In one example, etching the membrane includes forming at least two slits and at least one join.

In one example, the method further comprises forming a spring region, wherein forming the spring region includes depositing a material onto the substrate. Optionally, the material is a piezoelectric material. Optionally, the material is a metal.

In one example, the method further comprises depositing at least one electrode. Optionally, depositing the at least one electrode includes depositing the at least one electrode on the entire membrane, without depositing on the spring region.

According to one embodiment there is provided a wireless mobile device. The wireless mobile device comprises one or more antennas, a front end system that communicates with the one or more antennas, and one or more piezoelectric microelectromechanical systems microphones, each microphone including a substrate including at least one wall defining a cavity, the at least one wall defining an anchor region around a perimeter, a piezoelectric film layer forming a membrane, the piezoelectric film layer being supported at the anchor region by a spring region, and an electrode disposed over the piezoelectric film layer.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 3A is a plan view of a piezoelectric MEMS microphone with a spring region according to aspects of the present disclosure;

FIG. 3B is cross-sectional view of a piezoelectric MEMS microphone with a spring region according to aspects of the present disclosure;

FIG. 6A is a plan view of a piezoelectric MEMS microphone with a spring region according to aspects of the present disclosure;

FIG. 6B is a perspective view of a piezoelectric MEMS microphone with a spring region according to aspects of the present disclosure;

FIG. 8A is a graph of frequency versus device area for a spring microphone according to aspects of the present disclosure, and for a regular microphone in packaging according to aspects of the present disclosure;

FIG. 8B is a graph of output energy versus device area for a spring microphone according to aspects of the present disclosure, and for a regular microphone in packaging according to aspects of the present disclosure;

FIG. 10A-10G are cross-sectional views of a method of manufacturing a microphone according to aspects of the present disclosure;

DETAILED DESCRIPTION

Aspects and embodiments described herein are directed to a piezoelectric MEMS microphone comprising a piezoelectric film layer being supported at an anchor region by a spring arrangement for improving sensitivity of the device. We have appreciated that in a conventional diaphragm piezoelectric MEMS microphone, the sensitivity of the microphone is significantly degraded with even a small amount of residual stress as the output energy is reduced when a static deflection of the diaphragm is caused by the intrinsic stress. In a device according to the present disclosure, in which the microphone comprises a spring region, the intrinsic stress of the diaphragm of the device is reduced, thus increasing sensitivity.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
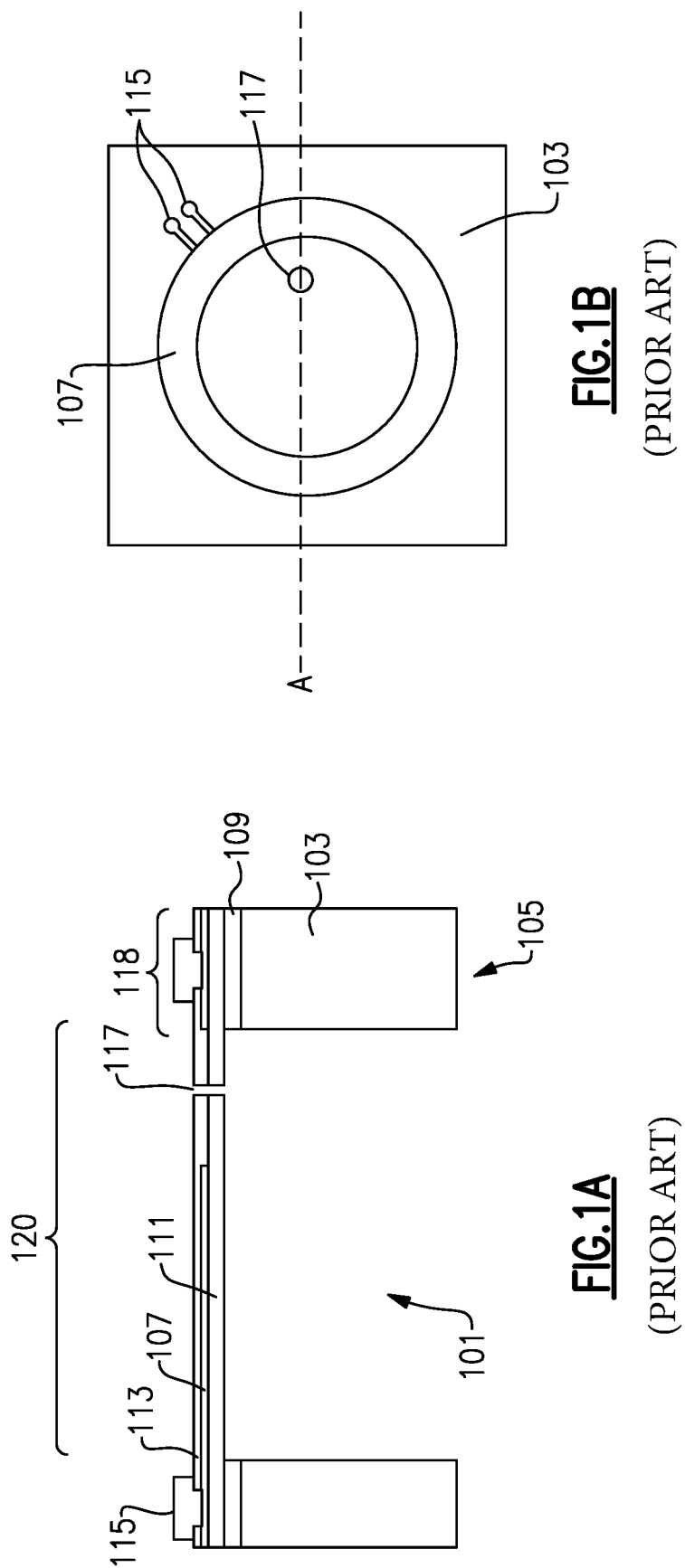
FIG. 1A is a cross-sectional view of a piezoelectric MEMS microphone with a diaphragm sensor according to known arrangements.
FIG. 1B is a plan view of a piezoelectric MEMS microphone with a diaphragm sensor according to known arrangements.

FIGS. 1A and 1B show a cross-sectional and plan view, respectively, of a known arrangement of a diaphragm piezoelectric MEMS microphone. As shown in FIG. 1A, the microphone comprises a substrate 103 wherein the substrate comprises walls 105. In some embodiments there may be four substrate walls, each meeting at a right angle, such that a polygonal cavity 101 is defined. In other embodiments the cavity may be circular, in which instances there may be one surrounding wall around the cavity, such that the wall may be circular. It will be appreciated that in a cross-sectional view, two cavity walls are shown, although these may comprise the same circular cavity wall. The substrate may be silicon, or any other suitable material. The microphone further comprises a membrane 120, wherein the membrane comprises a piezoelectric film layer which extends over a cavity such that the piezoelectric film layer 111 is supported by the substrate walls 105. The piezoelectric film layer may be formed of aluminum nitride, lithium niobate, lithium tantalate, or any other suitable piezoelectric material. The region at which the membrane overlaps the substrate walls 105, and thus the region at which the membrane is supported, is the anchor region 118. The microphone may comprise an insulating layer 109 located between the piezoelectric film layer 111 and the substrate 103. The microphone comprises at least one electrode 107. The electrode 107 may be any conductive material, such as molybdenum. The microphone may comprise a passivation layer 113. The passivation layer may be aluminum nitride. The microphone may comprise a bond pad 115 in contact with the electrode 107. In this arrangement the membrane comprises a vent hole 117 which extends through the membrane, such that air pressure may equalize either side of the membrane.

FIG. 1B is a plan view of the same arrangement as FIG. 1A. FIG. 1A was taken along the line labelled A in FIG. 1B. As shown in FIG. 1B, the membrane may be circular. The piezoelectric film layer 111 is overlaid with electrode 107 around its perimeter, such that the piezoelectric film layer is not exposed around its perimeter, but in the center of the membrane, the piezoelectric film layer 111 is exposed. The membrane comprises a vent hole 117 as described above. The bond pads 115 are shown. The substrate 103 may be rectangular, or any other suitable shape. The piezoelectric film layer is formed by deposition, resulting in intrinsic stress in the piezoelectric film layer which reduces the sensitivity of the microphone. In the arrangement of FIGS. 1A and 1B the intrinsic stress is not able to be released. The intrinsic stress may vary from device to device, resulting in difficulties as the sensitivity of the device is not able to be predicted. We have appreciated that a microphone in which the stress is able to be released would result in a better sensitivity and a higher yield as more microphones would have a sensitivity within a desired range as described in relation to embodiments disclosed herein.

Figure 2:
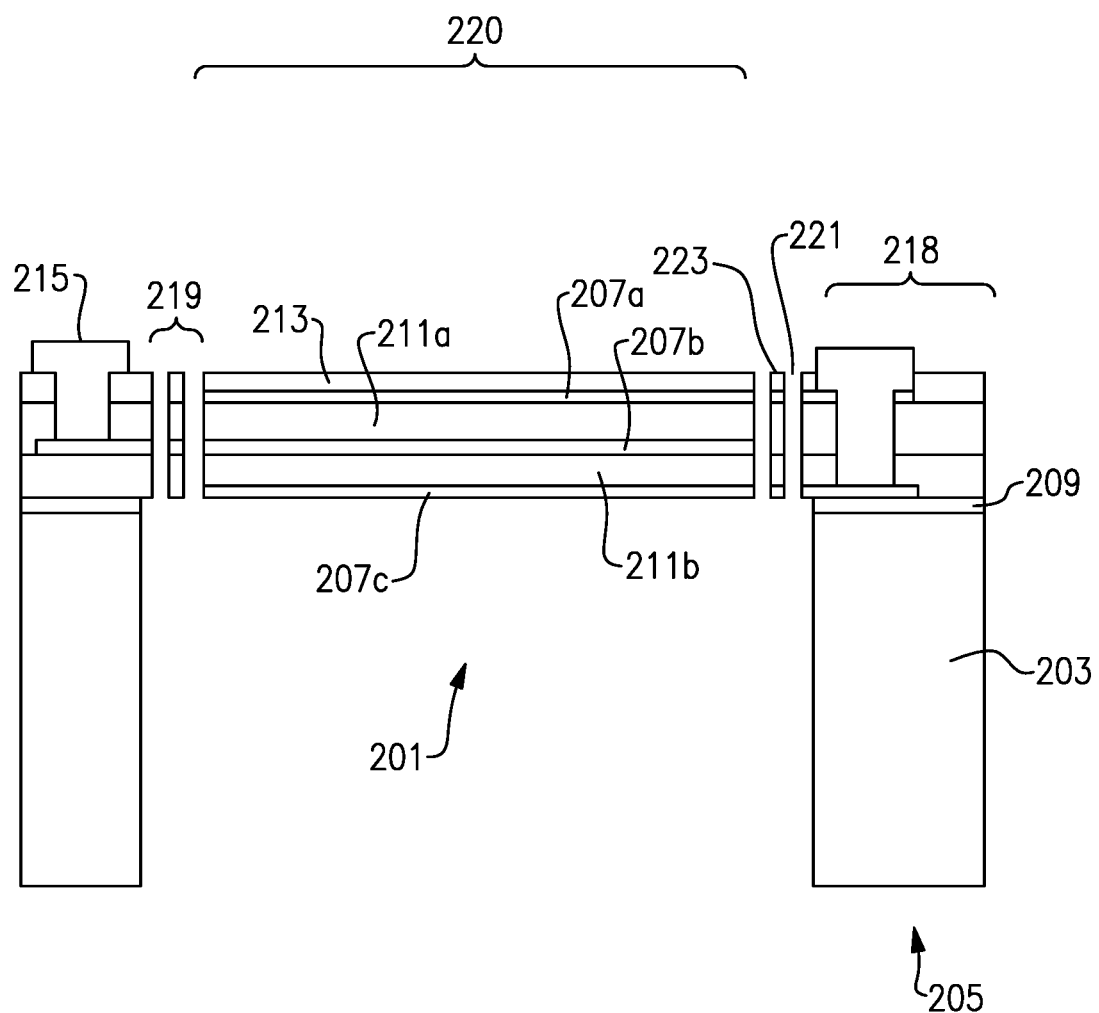
FIG. 2 is a cross-sectional view of a piezoelectric MEMS microphone with a diaphragm sensor according to aspects of the present disclosure.

FIG. 2 shows a cross-sectional view of a microphone according to an embodiment of the present disclosure. The microphone comprises a substrate 203 having substrate walls 205. In some embodiments the substrate may be silicon. In an embodiment comprising a rectangular cavity, the microphone may comprise four substrate walls, the two side walls as shown in the cross-sectional view, and an additional two end walls, where the four walls meet at right angles to form a rectangular cavity 201. In embodiments comprising a circular or polygonal cavity, the microphone may comprise one or more substrate walls 205. The microphone further comprises an insulating layer 209 located between the substrate wall 205 and an electrode, such as 207c, or a piezoelectric film layer, such as 211b. The microphone comprises a membrane 220 extending across the cavity 201 that is supported at its perimeter by the substrate walls 205. The region at which the membrane overlaps the substrate walls, and thus where it is supported by the substrate walls 205, is called the anchor region 218. The membrane comprises at least one piezoelectric film layer. In this embodiment the membrane comprises two piezoelectric film layers 211a and 211b, and three electrodes 207a, 207b and 207c. There is an electrode 207a on the frontside of the device, an electrode 207c on the backside of the device, i.e., on the cavity side of the membrane, and a center electrode 207b located in between the two piezoelectric film layers 211a and 211b such that they form an alternating stack. The electrodes may extend across the entire membrane such that they cover the entirety of the piezoelectric film layers which move. Alternatively, the electrodes may be located adjacent the anchor region, but not cover the center of the membrane, such that the piezoelectric film layer is exposed in the center, as described in relation to FIGS. 1A and 1B. The electrodes may extend into the anchor region. The microphone may further comprise bond pads 215. There may be electrical connections between bond pads and electrodes. The microphone may comprise a passivation layer 213 located on the front side of the membrane, i.e., the side of the membrane facing away from the cavity. The passivation layer may be composed of aluminum nitride, titanium nitride, or any other suitable material. The passivation layer prevents corrosion of the membrane, by preventing its exposure to air. The passivation later may be etched to expose the bond pads.

As shown in FIG. 2, the membrane is etched, such that multiple slits 221 are formed through the entire thickness of the membrane to define a spring region 219. The passivation layer 215, electrodes 207a, 207b and 207c, and the piezoelectric film layers 211a and 211b are etched to form the slits 221, and the remaining sections form joins 223, which thus define the spring region 219. It will be noted that although shown as two slits, and one join, this is for illustrative purposes only and there may be more slits and joins, to form the structure which defines the spring region. The spring region is located adjacent the anchor region, such that the spring region is not located above the substrate walls 205. It will be noted that the spring region may be slightly spaced away from the edge of the anchor region, as illustrated in FIG. 2. The microphone of this embodiment may comprise a vent hole, however, unlike the embodiment of FIGS. 1A-1B, the vent hole is optional as the slits in the springs provide the same functionality.

FIG. 3A shows a plan view of a microphone according to an embodiment of the present disclosure. The cross-sectional view shown in FIG. 2 is taken along line B of FIG. 3A. A section of the spring region 319 is shown in more detail in FIG. 3B, labelled as section A in FIG. 3A. It will be noted that the inner perimeter of the spring region is connected to the membrane, and the outer perimeter is connected to the anchor region, although the anchor region is not shown in the FIGS. 3A and 3B. It will be noted that the spring region may be uniform around the entire perimeter of the membrane 320. The passivation layer 313 is shown, and it will be noted that the rest of the layers within the membrane are not exposed underneath the passivation layer. The bond pads 315 are shown extending from the microphone. The lines illustrated in the spring region 319 show the section of membrane etched. Although not shown in FIGS. 3A-3B the passivation layer 313, electrodes 307a, 307b and 307c, and the piezoelectric film layer 311a and 311b are etched to define the spring region 319. As described in relation to FIG. 2, there are at least two rows of slits 321 as illustrated in the cross-sectional view. There are multiple rows of slits 321 etched such that the remaining joins 323 of material form a spring-like, or meandering, structure which connects the membrane to the anchor region. It will be noted that the word "spring" as used herein, is not limited to a helical spring arrangement and instead refers to a structure in which material has been removed, so that the remaining region of material has an increased freedom, and is able to be compressed or stretched. The spring region may be implemented in a variety of ways including forming the spring region separately from the diaphragm or forming it from the same set of layers as the diaphragm but with material removed. The removal of material allows the remaining material to exhibit a greater degree of freedom thereby creating a region that has less stress and less rigidity. As an example, the removal of material may form one or more slits with material remaining either side of the slits referred to as joins. In some embodiments the joins may form a continuous material extending from the anchor region to the edge of the membrane which extends around the circumference of the membrane, such that the perimeter of the membrane is always in contact with the spring region, as in the embodiment of FIGS. 3A-3B. In other embodiments, the at least two joins may form a continuous material extending from the anchor region to the edge of the membrane, but only extending part of the way around the circumference, such that there are regions of the membrane which are not contacted by the material. One example of such an embodiment, as described in more detail below, is a zig zag design where there are multiple zig zag sections located around the membrane. Such a zig zag arrangement allows greater movement and less stress in the manner of a set of springs around the circumference of the membrane. Therefore, the spring region 319 as described herein results in a membrane with an increased freedom. This freedom releases intrinsic stress in the membrane, which has been formed during manufacturing of the piezoelectric film layers. The release of the stress may be in the x and y axis, i.e., in the plane of the surface of the membrane and/or the release of the stress may be in the z direction, i.e., in the plane of the movement of the membrane into and out of the cavity. Although it is described above that the spring portion 319 is formed from the etching of every layer of the membrane, in other embodiments the spring region 319 may be composed of a different material deposited during or after the deposition of the piezoelectric film layer and/or the electrodes. The spring portion may be formed from metal which results in a more elastic and softer spring region than a spring region formed from the layers of the membrane. Alternatively, the spring region may be formed from piezoelectric material, or any other suitable material.

Although not shown in FIGS. 3A-3B, the electrodes may cover the entirety of the membrane such that the output energy created by stress and strain in the piezoelectric film layers is maximized. The whole surface of the membrane has similarly high stress when the membrane is excited by sound pressure. Although, it will be appreciated that the electrodes may be designed to cover less of the membrane in other embodiments. The top and bottom electrodes are of opposite polarity, and if the microphone comprises a center electrode it may act as a ground electrode. If the spring region is composed of piezoelectric material, it will generate piezoelectric charges with rapidly changing polarities, and therefore the spring region may not be suitable for electrode placement. If the spring region is a material other than piezoelectric material, there may be no electrodes placed here, as there will be no charges due to the piezoelectric effect created when the spring region moves.

Figure 4:
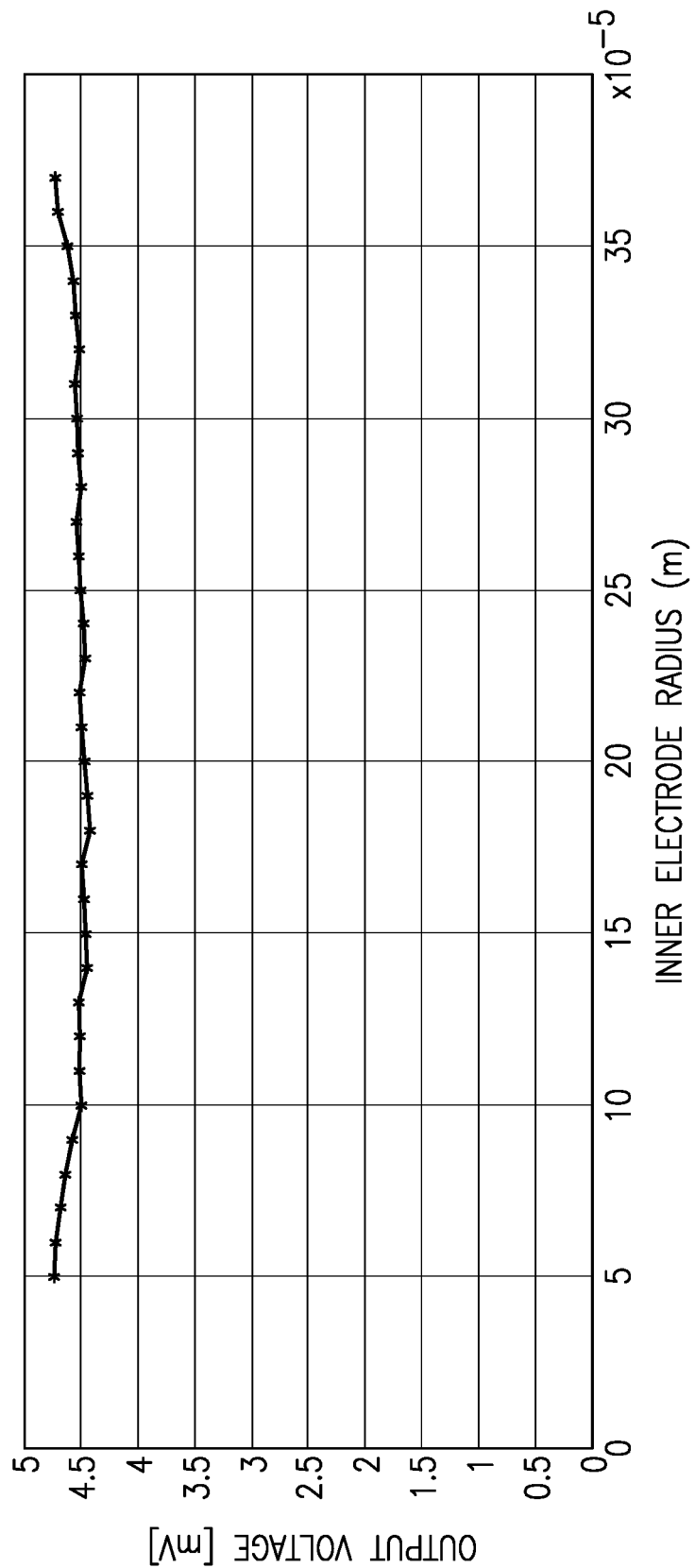
FIG. 4 is a graph of output voltage versus inner electrode radius for a microphone according to aspects of the present disclosure.

FIG. 4 shows a graph of output voltage vs inner electrode radius. As shown, the output voltage is relatively constant with change in inner electrode radius. Here, inner electrode radius means the radius of the electrode which covers the membrane. As shown, for the range of radii between 50 micrometers and 350 micrometers, the output voltage is 4.5 mV±0.3 mV. Therefore, it will be appreciated that any radius of inner electrode may be used in the device without a significant change in output voltage, and thus sensitivity of the device. Preferably, as described herein, the electrode covers the entire membrane, to maximize the output energy, and minimize parasitic capacitance. Parasitic capacitance is present between the electrodes and other conductive materials, such as a metal spring region, or bond pads. Parasitic capacitance will increase the capacitance of the device, thus decreasing the voltage output, and consequently the sensitivity. However, with larger electrodes which have larger capacitance, the change in capacitance due to parasitic capacitance is proportionally less, and therefore causes less of an overall decrease in sensitivity.

Figure 5B:
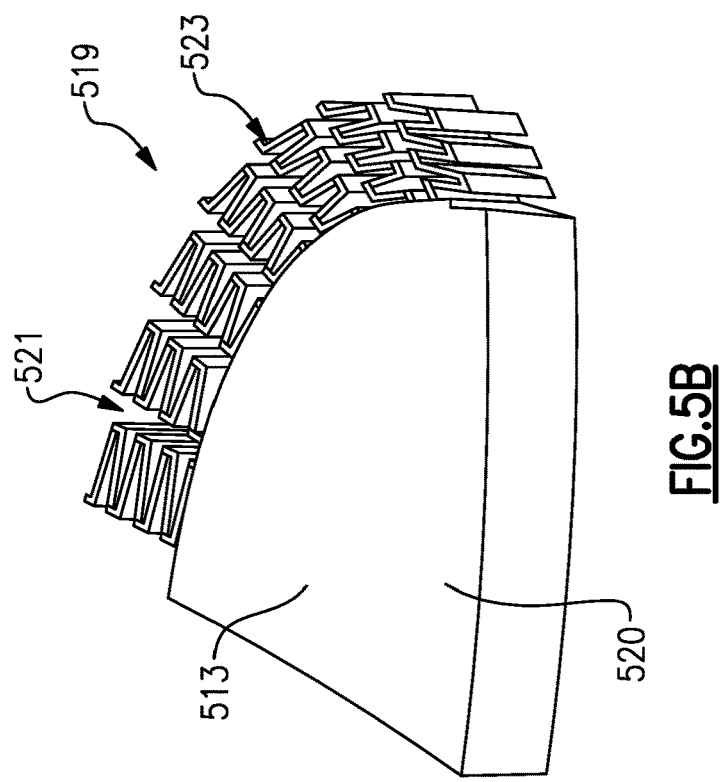
FIG. 5B is a perspective view of a piezoelectric MEMS microphone with a spring region according to aspects of the present disclosure.
Figure 5A:
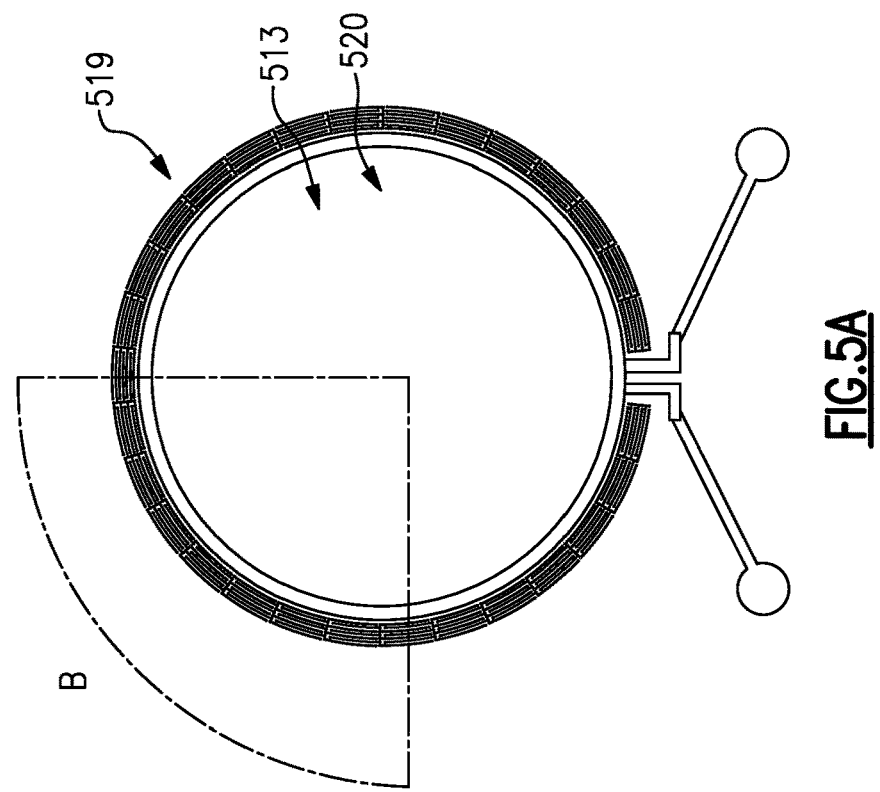
FIG. 5A is a plan view of a piezoelectric MEMS microphone with a spring region according to aspects of the present disclosure.

FIG. 5B is a detailed view of a section, labelled section B in FIG. 5A, of the membrane 520 and spring region 519, wherein FIG. 5B is a perspective view of an embodiment of a microphone. It will be noted that the inner perimeter of the spring region is connected to the membrane, and the outer perimeter is connected to the anchor region, although the anchor region is not shown in FIGS. 5A and 5B. The passivation layer 513 is shown, and it will be noted that the rest of the layers within the membrane are not exposed underneath the passivation layer. As shown, the removal of the material to form slits 521, and leave joins 523, which form the spring region, as described herein, results in a flexible region, which is able to be stretched and compressed, and provides freedom to the membrane. In the embodiment of FIGS. 5A and 5B, as illustrated, the spring region comprises a plurality of zig zag regions, such that the zig zag regions are spaced around the perimeter of the membrane, extending between the anchor region and the membrane. As shown, in some embodiments, there may be regions of the perimeter of the membrane which are not in contact with the zig zag region. It will be appreciated, that the zig zag design is only an example of possible designs, and instead there may be a plurality of coiled material regions located around the perimeter of the membrane, or there may be a plurality of spiral regions, or any other suitable design. The intrinsic stress formed during manufacturing of the piezoelectric film layers is released by this freedom. It will be noted that although shown in FIG. 5B as having multiple joins 523 forming a meandered material with multiple peaks and troughs, the spring region may be any design in which material has been removed to create a more flexible region which may be compressible and/or stretchable, i.e., acting like a spring.

FIG. 6A shows an alternative spring arrangement 619, located adjacent a membrane 620. FIG. 6B illustrates a more detailed view of section C as labelled in FIG. 6A. As shown, the spring region comprises multiple slits 621 where the material has been removed through the entire thickness of the membrane, or other material. The slits may be any shape, and located at any distance relative to each other, such that the material has sufficient flexibility to release at least some intrinsic stress from the membrane, i.e., the spring region is designed such that the spring region is more flexible than the membrane. In this embodiment the joins 623, i.e., the material remaining after the removal of the material to form the slits, form a continuous material which extends between the anchor region and the membrane, and is continuous around the perimeter of the membrane. As shown in FIGS. 6A-6B, the slits may be shaped as crosses, however they may be any suitable shape, such as rectangles, diamonds, circles, or other polygons.

Figures 7A, 7B:
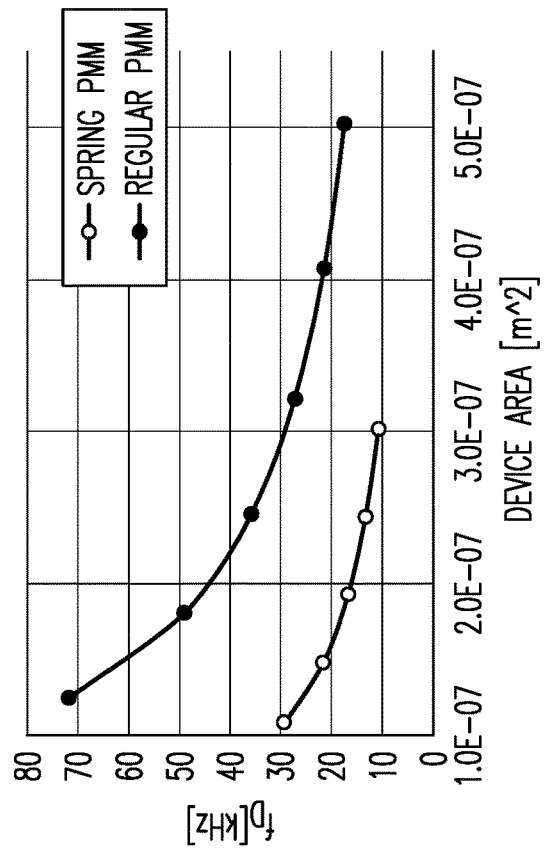
FIG. 7A is a graph of frequency versus device area for a spring microphone according to aspects of the present disclosure, and for a regular microphone out of packaging.
FIG. 7B is a graph of output energy versus device area for a spring microphone according to aspects of the present disclosure, and for a regular microphone out of packaging.

FIGS. 7A and 7B illustrate comparisons between results of simulations of resonant frequency and output energy as a function of device area of a spring piezoelectric MEMS microphone as disclosed herein versus a regular piezoelectric MEMS microphone, i.e., a microphone without a spring region. The results are for unpackaged microphones.

FIG. 7A shows resonant frequency versus device area. As shown, for devices of the same area, the microphone with a spring region as disclosed herein has a lower resonant frequency than the regular microphone. The resonant frequency of the microphone with a spring region is lower as the spring arrangement is softer than the membrane. Therefore, the microphone with a spring region may not be preferable in devices in which the resonant frequency is desired to be higher. However, the use of a spring region results in a microphone with a more predictable sensitivity, and therefore is preferable in devices in which the predictability of the sensitivity is important.

FIG. 7B shows the output energy versus device area for a microphone with a spring region as disclosed herein compared to that of a regular microphone. As shown, in the lower frequency range the output energy increases with size at a more rapid rate for the microphone with a spring arrangement, compared to that of a regular microphone of the same size. The spring arrangement results in a microphone with a greater energy output. In the single membrane regular microphone arrangement the polarization at the center of the membrane and at the outside region is substantially different. This limits the area of the membrane from which the device can collect energy with the electrodes. Whereas, with a spring region, the whole inner membrane may be used to collect energy, and therefore the area of piezoelectric material from which charge can be collected is larger. The spring makes a very soft region, which alters the polarization of the center region. This results in more of the membrane being able to collect energy at any given frequency.

FIGS. 8A and 8B compare results of simulations of resonant frequency and output energy as a function of device area for a spring piezoelectric MEMS microphone as disclosed herein versus a regular piezoelectric MEMS microphone, i.e., a microphone without a spring region. The results are for microphones in packaging with a back volume of 13 fF acoustic compliance. With increased compliance the performance improvement of piezoelectric MEMS microphones with spring regions as compared to that of regular microphones is reduced. As shown in FIG. 8A, the resonant frequency of the piezoelectric MEMS microphones with a spring region is lower than that of the regular piezoelectric MEMS microphones after packaging. However, as also shown in FIG. 8A, the bandwidth of the piezoelectric MEMS microphones with a spring region is still acceptable for most audio applications. For example, the size of piezoelectric MEMS microphones with spring regions can be reduced to increase the bandwidth to meet requirements from voiceband or narrowband (typically 300 Hz to 3.4 kHz), to wideband (approximately 50 Hz to 7 kHz), up to the most recent superwideband (approximately 50 Hz to 14 kHz) and fullband (approximately 20 Hz to 20 kHz). As shown in FIG. 8B, packaged piezoelectric MEMS microphones with spring regions are able to achieve similar output energy as regular piezoelectric MEMS microphones in packaging with much smaller device area. However, as will be appreciated, when the microphone is in packaging how much the device moves is more important, and as a membrane with a spring region has more freedom to move, the output energy is not increased as much as compared to the output energies for microphones out of packaging. The microphone with a spring region has a higher output energy at a smaller size, for the same reasons as described in relation to FIG. 7B, such as being able to collect energy from a larger area of the membrane.

Figure 9B:
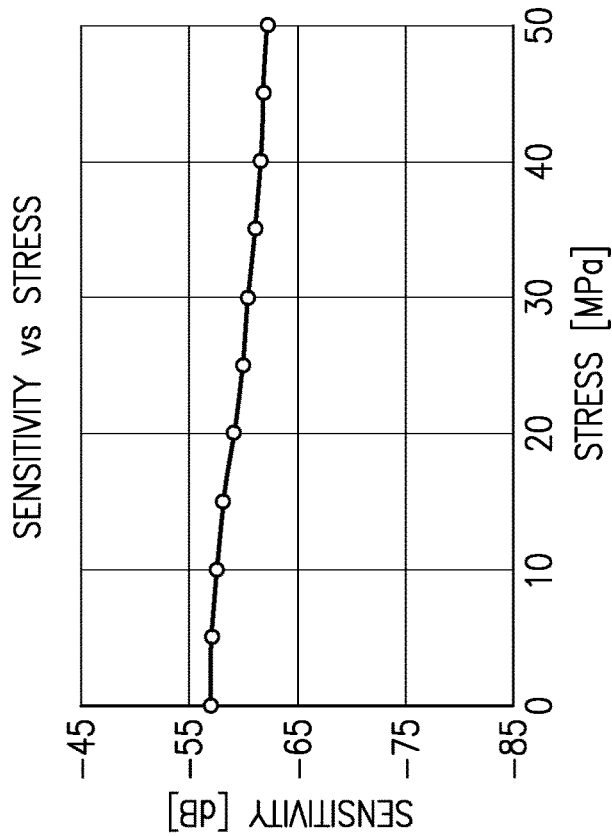
FIG. 9B is a graph of sensitivity versus stress of a microphone arrangement according to aspects of the present disclosure.
Figure 9A:
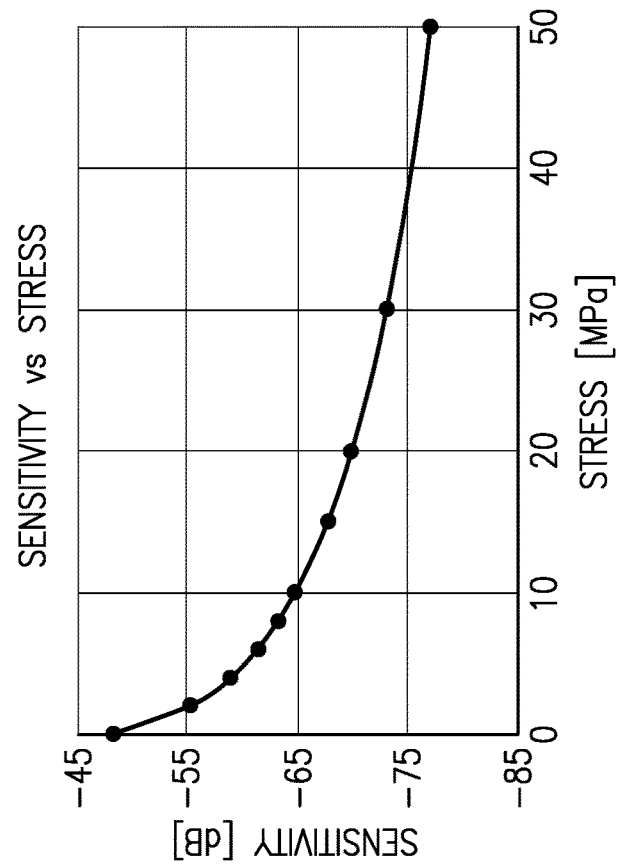
FIG. 9A is a graph of sensitivity versus stress of a known microphone arrangement.

FIG. 9A illustrates results of a simulation of sensitivity vs. stress for a regular piezoelectric MEMS microphone arrangement in which the membrane is fully clamped around its perimeter. As described herein, the manufacturing process of the membrane results in intrinsic stress within the membrane. This stress results in a significant performance degradation, due to "stress stiffening" of the membrane which suppresses the movement of the membrane due to impingement of acoustic signals, and thus its output voltage drops rapidly with greater membrane stress and strain. For example, as shown in FIG. 9A, a residual stress of 10 MPa in the membrane reduces the sensitivity of a regular piezoelectric MEMS microphone by around 13 dB. The sensitivity decreases another 12 dB when the stress increases to 50 MPa. Residual stress may therefore result in failed devices, and therefore due to the manufacturing intolerances, the yield of regular piezoelectric MEMS microphones is decreased.

FIG. 9B illustrates results of a simulation of sensitivity vs. stress for a piezoelectric MEMS microphone with a spring as disclosed herein. As shown, the sensitivity of the microphone is relatively constant as the stress increases. For example, in a microphone in which there is no intrinsic stress, the sensitivity is around −57 dB, and in a microphone is which there is 50 MPa stress, the sensitivity is around −63 dB, i.e., a 6 dB decrease in sensitivity compared to the 25 dB decrease in the regular microphone for the same change in stress. The sensitivity of the microphone with the spring region is therefore more tolerant to intrinsic stress as the spring region relaxes the intrinsic stress through the deformation of the springs, releasing the stress. Therefore, any variation due to the manufacturing process effects the microphone with a spring less than a normal piezoelectric MEMS microphone. It will be noted that the sensitivity of the microphone with a spring does not peak when there is no stress, unlike the regular microphone arrangement. However, it has been appreciated that for many devices, a predictable sensitivity is more important than a higher sensitivity in the rare device in which there is no or very little intrinsic stress.

Manufacturing of Piezoelectric MEMS Microphone

A method of manufacturing of a piezoelectric MEMS microphone as disclosed herein will now be described. It is noted that although this technique is described in relation to the microphone described herein, it is compatible with any piezoelectric MEMS microphone. It will be appreciated that the features of the microphone as described in the above description may be implemented here, such as but not limited to the materials and dimensions described. It will be noted that the figures are for illustrative purposes only, and the features are not to scale.

FIGS. 10A-10G illustrate a cross-sectional view of a method for manufacturing a piezoelectric MEMS microphone according to an embodiment of the present disclosure.

FIG. 10A shows the step of oxidizing the top layer of a substrate 1003. The oxidation process may include thermal oxidation. In embodiments in which the substrate is formed from silicon, the oxidized layer 1009 will be composed of silicon dioxide. It is noted that the oxidized layer formed will be dependent on the material of the substrate. It will be appreciated that the layer of oxide may be any thickness sufficient to protect other parts from etching in the steps described hereafter. Alternatively, the oxide layer may be deposited on the substrate, instead of being formed by oxidation of the substrate.

FIG. 10B shows the step of depositing three electrodes, 1007a, 1007b, and 1007c, and two piezoelectric film layers 1011a and 1011b, such that the electrodes and piezoelectric film layers form an alternating stack. The piezoelectric film layers may be composed of aluminum nitride, lithium niobate, lithium tantalate, or any other suitable piezoelectric material. It will be noted that any suitable conductive material can be used for the electrodes, for example, molybdenum, titanium, or others.

FIG. 10C shows the step of forming or providing a passivation layer 1013 on top of the electrode 1007a and/or the piezoelectric film layer 1011a. The passivation layer may be composed of aluminum nitride or titanium nitride. The passivation layer may be formed or applied by sputtering or by chemical vapor deposition. The passivation layer may protect the microphone from corrosion or other damage by the outside atmosphere.

FIG. 10D shows the step of forming bond pads 1015. Optionally the bond pads can be formed or applied using a sputter machine.

FIG. 10E shows the step of forming the spring region 1019. The spring region may be adjacent the anchor region 1018 within which the membrane 1020 overlaps the substrate walls. Therefore, the membrane is connected to the substrate walls by the spring region 1019. As described herein, the spring region 1019 may be formed by etching vertically through the piezoelectric film layers, electrodes, and passivation layer, to create slits 1021 in the membrane extending from a top surface of the membrane to a bottom surface of the membrane to extend completely through the membrane. The membrane may be etched using a dry etch. The dry etch may be carried out by any suitable method, such as deep reactive ion etching (DRIE). The material around the slits which has not been etched are described herein as joins 1023. The spring region may be any pattern of joins and slits which result in a more flexible area, which is able to compress or stretch, and thus release intrinsic stress in the membrane, as shown in FIGS. 5A-5B and 6A-6B. Although shown as only two rows of material removed to form the spring region, it will be appreciated, from FIGS. 5A-5B and 6A-6B, that this is for illustrative purposes only, and in practice, there may be more removed rows to form coils, or crosses or any other suitable design.

Figure 10F:
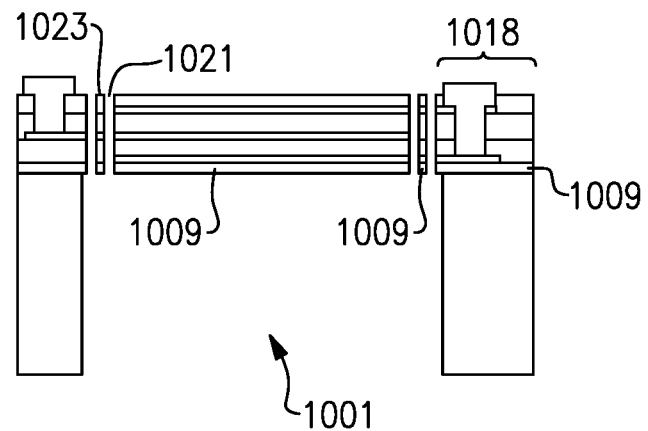

FIG. 10F shows the step of etching a section of the silicon substrate to define a cavity 1001. The cavity is etched from the back side of the device, using an anisotropic etch. The cavity is etched by silicon etching, such that the silicon dioxide layer 1009 between the beam and substrate is not etched. The cavity may be any shape, such as rectangular, triangular, circular, or any other shape. The cavity is defined by the substrate walls 1005.

Figure 10G:
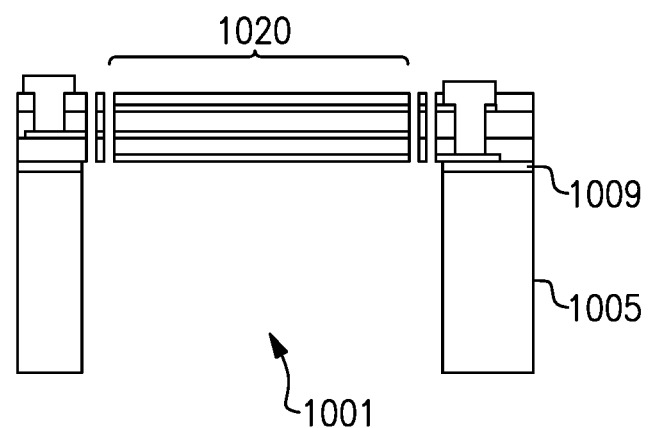

FIG. 10G shows the step of etching the silicon dioxide layer 1009. In this step an isotropic etch is used to remove the silicon dioxide layer on the cavity side of the piezoelectric film layer. It will be noted that any suitable isotropic etchant may be used. The layer of silicon dioxide located between the piezoelectric film layer and the substrate walls 1005 is not etched away, due to its protection by the remaining silicon, which the silicon dioxide etching does not remove. This remaining layer acts as an insulating layer as described herein.

FIGS. 11A-11H illustrate a cross-sectional view of another method for manufacturing a piezoelectric MEMS microphone according to an embodiment of the present disclosure.

Figure 11D:
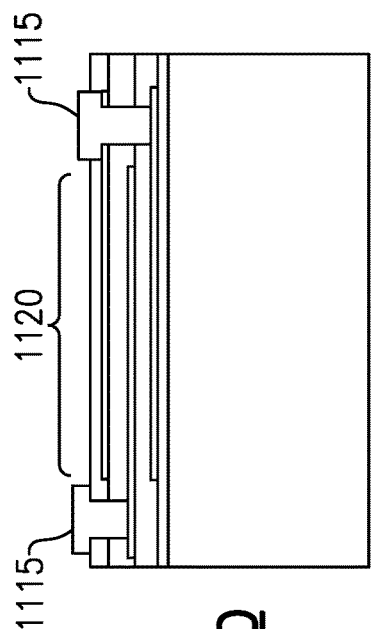
FIG. 11A-11H are cross-sectional views of a method of manufacturing a microphone according to aspects of the present disclosure.
Figure 11E:
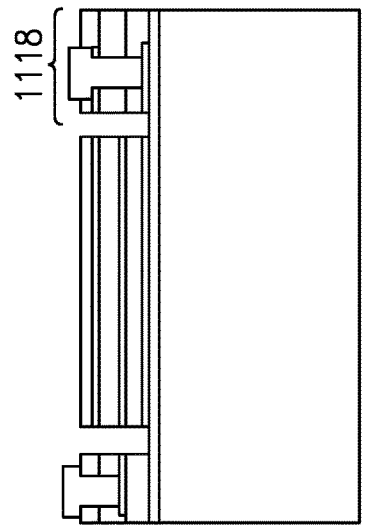
Figure 11A:
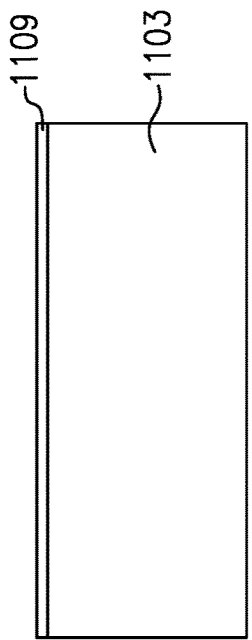

FIG. 11A shows the step of oxidizing the top layer of a substrate 1103. The oxidation process may include thermal oxidation. In embodiments in which the substrate is formed from silicon, the oxidized layer 1109 will be composed of silicon dioxide. It is noted that the oxidized layer formed will be dependent on the material of the substrate. It will be appreciated that the layer of oxide may be any thickness sufficient to protect the other parts from etching in the steps described hereafter. Alternatively, the oxide layer may be deposited on the substrate, instead of being formed by oxidation of the substrate.

Figure 11B:
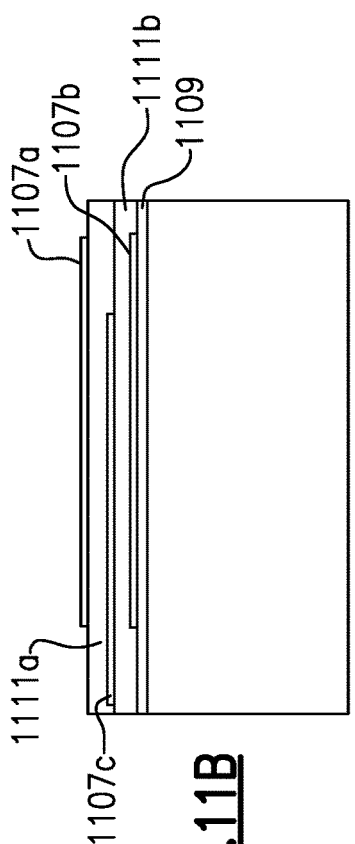

FIG. 11B shows the step of depositing three electrodes, 1107a, 1107b, and 1107c, and two piezoelectric film layers 1111a and 1111b, such that the electrodes and piezoelectric film layers form an alternating stack. Optionally the piezoelectric film layers may be composed of aluminum nitride, or lithium niobate, lithium tantalate, or any other suitable piezoelectric material. It will be noted that any suitable conductive material can be used for the electrodes, for example, molybdenum, titanium, or others.

Figure 11C:
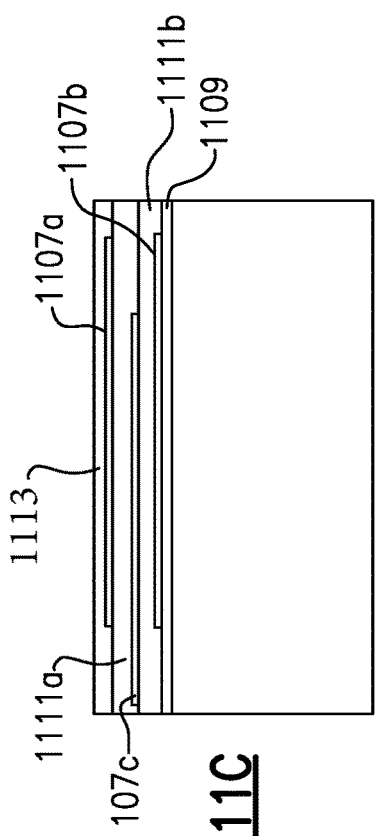

FIG. 11C shows the step of forming or providing a passivation layer 1113 on top of the electrode 1107a and/or the piezoelectric film layer 1111a. The passivation layer may be composed of aluminum nitride or titanium nitride. The passivation layer may be formed or applied by sputtering or by chemical vapor deposition. The passivation layer may protect the microphone from corrosion or other damage by the outside atmosphere.

FIG. 11D shows the step of forming bond pads 1115. The bond pads may be formed or applied using a sputter machine.

FIG. 11E shows the first step of forming the spring region 1119. As described herein, the spring region may be formed from a material different from the material from which the membrane is formed. For example, the spring material may be formed of metal, or a piezoelectric film layer, or another material. This material may be deposited separately, and therefore in the step of FIG. 11E, a section of the electrodes and piezoelectric film layers are etched from the front side of the device to a width of the spring portion. The region etched may be adjacent the anchor region 1118, such that in the next step shown in FIG. 11F, the spring region may be formed adjacent the anchor region. The oxidized layer may not be etched, such that the substrate is not exposed. The etch used may be a dry etch, such that the walls created are vertical as shown in FIG. 11E. The dry etchant is chosen such that the substrate 1103 and the oxidizing layer, in embodiments in which this is present, are not etched. For example, deep reactive ion etching (DRIE) may be used. The spring region 1119 may be any pattern which results in a more flexible area, which is able to compress or stretch, and thus release intrinsic stress in the membrane, as shown in FIGS. 5A-5B and 6A-6B.

Figure 11F:
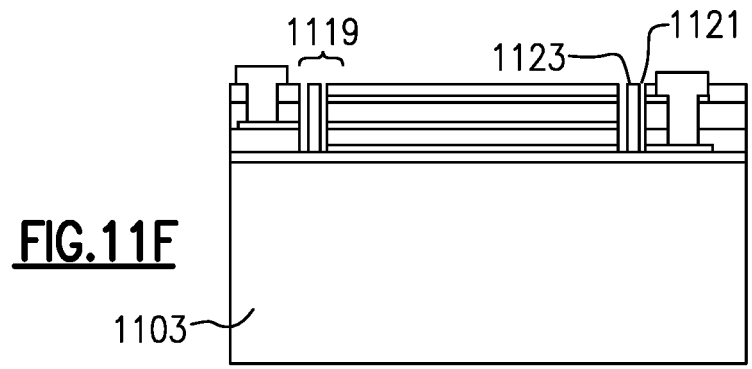

FIG. 11F shows the second step of forming the spring region 1119. As described above, a material different than the material of the membrane forms the spring region 1119. The material may be deposited onto the oxidized layer 1109 in the pattern of a spring region, or may be deposited and then etched into a spring region 1119. The material may be metal, a piezoelectric film layer, or any other suitable material. As described herein, such as in relation to FIG. 10E, although the spring region is shown in the cross-sectional view as having two slits 1121 and one join 1123, it will be appreciated that in the device, there may be more than two slits 1121, such that a coiled design, or a corrugated region, or a region as shown in FIGS. 6A-6B is formed. It will be noted that the etching or patterning of the material to form the spring region 1119 may be carried out to result in any suitable design which results in a flexible region.

Figure 11G:
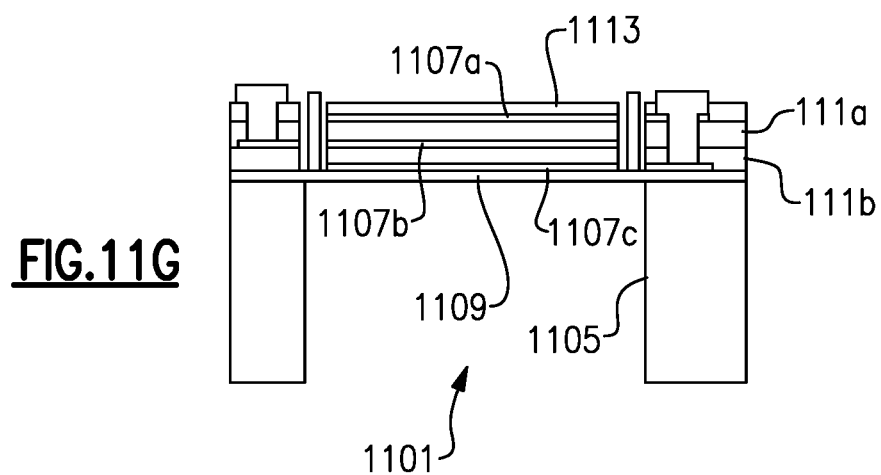

FIG. 11G shows the step of etching the substrate to define a cavity 1101. The cavity is etched from the back side of the device using an anisotropic etch. The cavity is etched by silicon etching, such that the silicon dioxide layer 1109 between the beam and substrate is not etched. The cavity may be any shape, such as rectangular, triangular, circular, or any other shape. The cavity is defined by the substrate walls 1105.

Figure 11H:
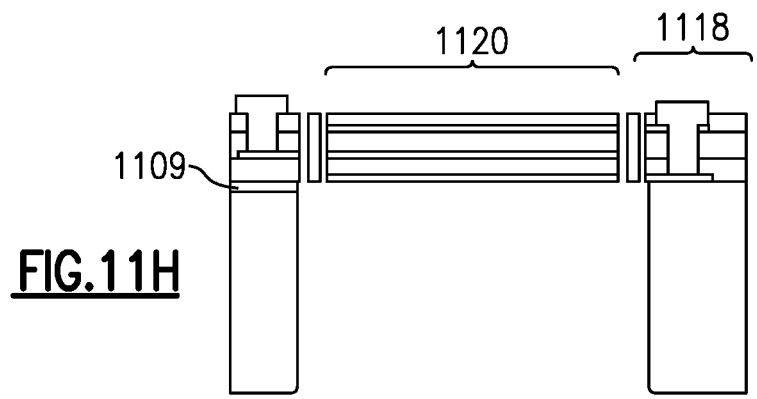

FIG. 11H shows the step of etching the silicon dioxide layer 1109. In this step an isotropic etch is used to remove the silicon dioxide layer on the cavity side of the piezoelectric film layer. It will be noted that any suitable isotropic etchant may be used. The layer of silicon dioxide located between the piezoelectric film layer and the substrate walls 1105 is not etched away, due to its protection by the remaining silicon, which the silicon dioxide etching does not remove. This remaining layer acts as an insulating layer as described herein.

Figure 12:
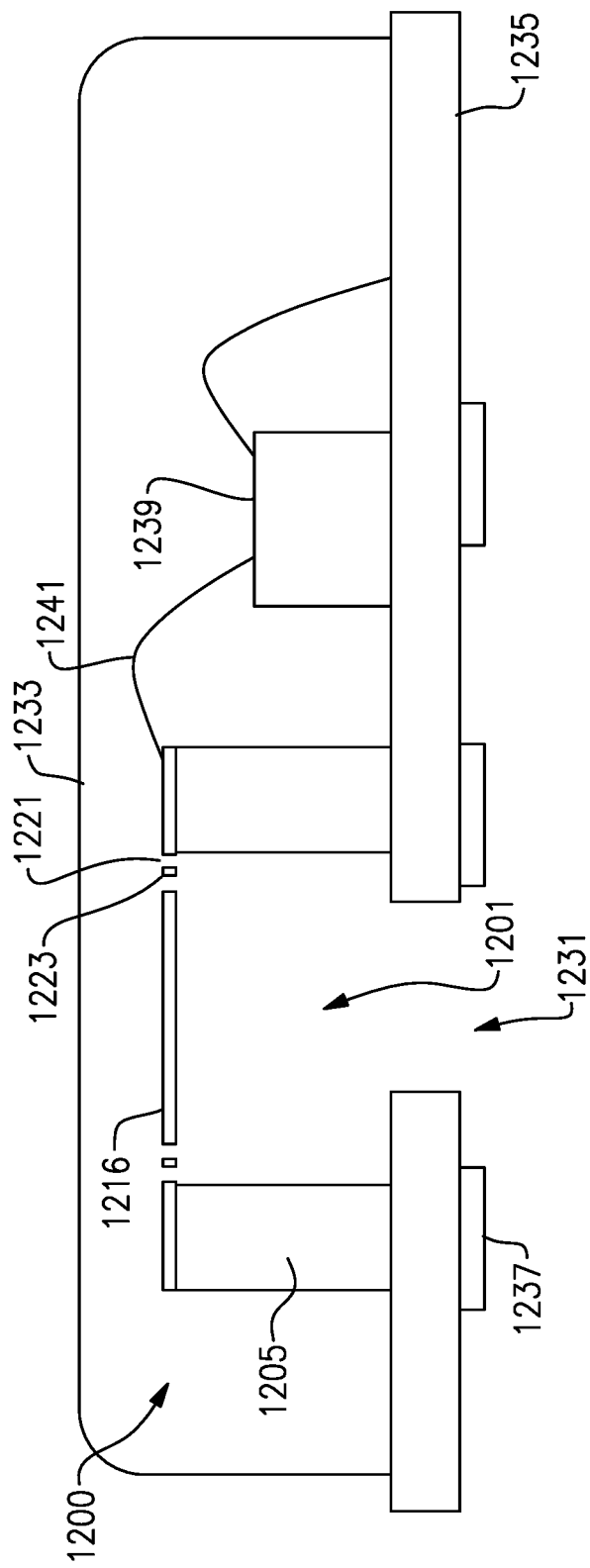
FIG. 12 is a cross-sectional view of a MEMS microphone packaged inside a metal lid with an ASIC in accordance with aspects of the present disclosure.

FIG. 12 illustrates a cross-sectional view of a microphone arrangement. It will be appreciated that this is an example embodiment for illustrative purposes, and the microphone can be included in a variety of different arrangements. As illustrated, the microphone 1200 of FIG. 12 is located within a cap 1233. The microphone 1200 may be the microphone of any embodiment described herein. As shown, the microphone comprises a spring region comprising at least two slits 1221, and at least one joining region 1223, as described herein. The cap may be flexible or rigid, and may be any suitable material, such as a metallic material. The cap creates a seal with a substrate 1235 (for example, a printed circuit board), such that air only flows into and out of the arrangement via a sound inlet 1231. The substrate 1235 may be any suitable material. The cap 1233 also mitigates electromagnetic interference. Sound waves enter the arrangement, causing the membrane 1216 to bend and produce voltage due to the piezoelectric effect, as described herein. The arrangement comprises at least one solder pad 1237 such that the microphone arrangement may be soldered to external devices, not shown here. The microphone arrangement further comprises an application specific integrated circuit chip/die ("ASIC") 1239. The MEMS microphone is electrically connected by wire bonding 1241. Although not shown, it will be appreciated that the wire bonding may be connected to the one or more electrodes of the microphone, as described herein.

It will be noted that FIG. 12 is a cross-sectional view of the microphone arrangement, such that the one or more solder pads, substrate 1235, MEMS microphone 1200, ASIC 1239, and cap 1233 extend into the page such that they are three-dimensional, as described in relation to other embodiments disclosed herein.

Figure 13:
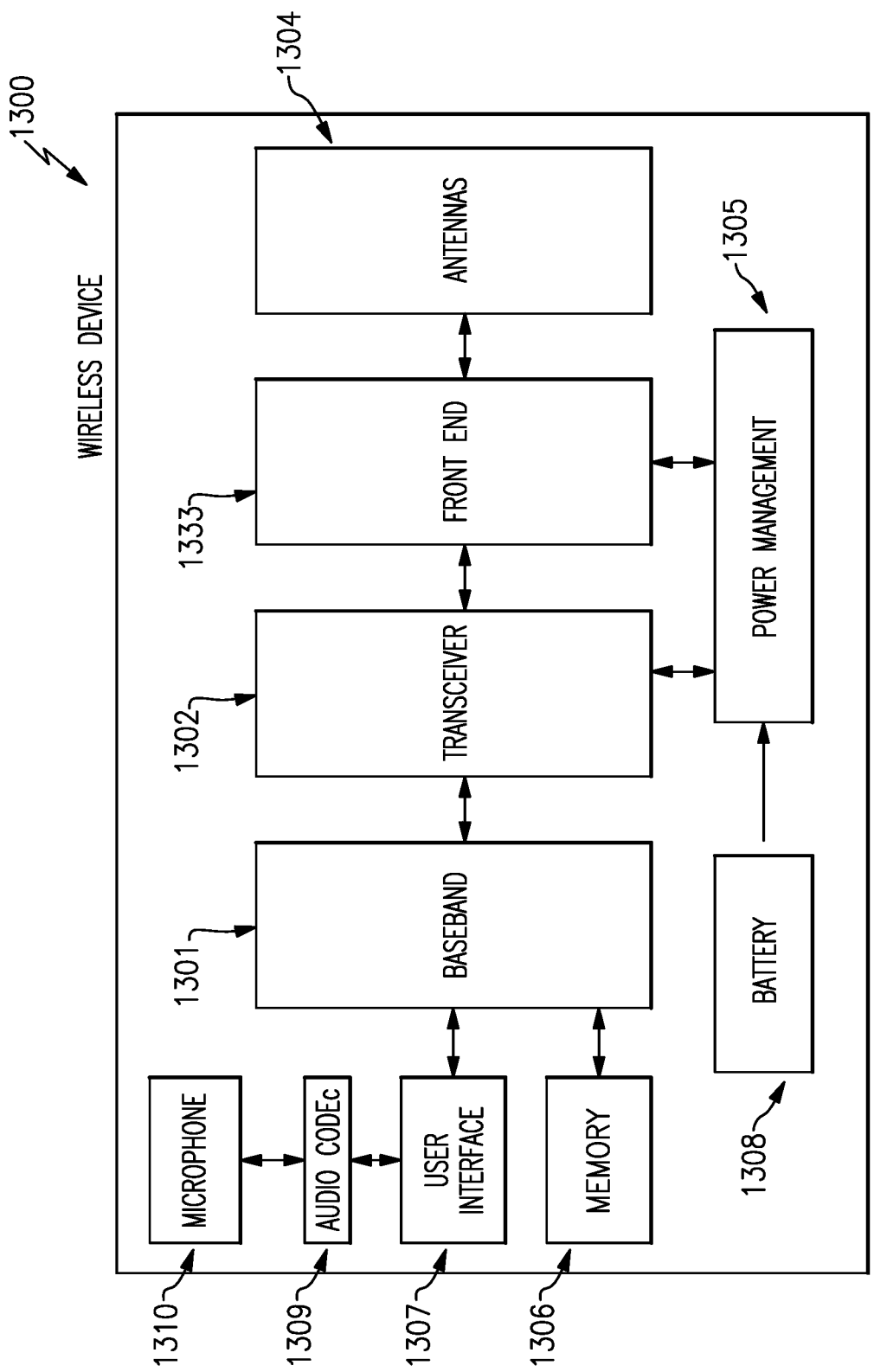
FIG. 13 is a schematic of a wireless device comprising a MEMS microphone in accordance with aspects of the present disclosure.

FIG. 13 is a schematic diagram of one embodiment of a wireless device 1300. The wireless device can be, for example, but not limited to, a portable telecommunication device such as, a mobile cellular-type telephone. The wireless device includes a microphone arrangement 1300, including an improved microphone as described herein in relation to FIGS. 4 to 10, and may include one or more of a baseband system 1301, a transceiver 1302, a front end system 1303, one or more antennas 1304, a power management system 1305, a memory 1306, a user interface 1307, a battery 1308, and audio codec 1309. The microphone arrangement may supply signals to the audio codec 1309 which may encode analog audio as digital signals or decode digital signals to analog. The audio codec 1309 may transmit the signals to a user interface 1307. The user interface 1307 transmits signals to the baseband system 1301. The transceiver 1302 generates RF signals for transmission and processes incoming RF signals received from the antennas 1304.

The transceiver 1303 aids in conditioning signals transmitted to and/or received from the antennas 1304.

The antennas 1304 can include antennas used for a wide variety of types of communications. For example, the antennas 1304 can include antennas 1304 for transmitting and/or receiving signals associated with a wide variety of frequencies and communications standards.

The baseband system 1301 is coupled to the user interface to facilitate processing of various user input and output, such as voice and data. The baseband system 1301 provides the transceiver 1302 with digital representations of transmit signals, which the transceiver 1302 processes to generate RF signals for transmission. The baseband system 1301 also processes digital representations of received signals provided by the transceiver 1302. As shown in FIG. 13, the baseband system 1301 is coupled to the memory to facilitate operation of the wireless device.

The memory can be used for a wide variety of purposes, such as storing data and/or instructions to facilitate the operation of the wireless device and/or to provide storage of user information.

The power management system 1305 provides a number of power management functions of the wireless device.

The power management system 1305 receives a battery voltage from the battery 1308. The battery 1308 can be any suitable battery for use in the wireless device, including, for example, a lithium-ion battery.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A piezoelectric microelectromechanical systems microphone, comprising:
   a substrate including at least one wall defining a cavity, the at least one wall defining an anchor region;
   a piezoelectric film layer forming a membrane covering a central region of the cavity, the piezoelectric film layer being supported at the anchor region by a spring region, the spring region being formed from the piezoelectric film layer; and
   an electrode disposed over the piezoelectric film layer.

2. The microphone of claim 1 wherein the spring region includes at least two slits and at least one join.

3. The microphone of claim 2 wherein the at least two slits are polygonal.

4. The microphone of claim 2 wherein the at least two slits are cross shaped.

5. The microphone of claim 1 wherein the spring region includes a plurality of zig zag portions.

6. The microphone of claim 1 wherein the microphone further comprises a passivation layer.

7. The microphone of claim 1 wherein the spring region is adjacent the anchor region.

8. The microphone of claim 1 wherein the microphone has a second and third electrode.

9. The microphone of claim 1 wherein the microphone has a second piezoelectric film layer.

10. A wireless mobile device comprising:
    one or more antennas;
    a front end system that communicates with the one or more antennas; and one or more piezoelectric microelectromechanical systems microphones, each microphone including a substrate having at least one wall defining a cavity, the at least one wall defining an anchor region, a piezoelectric film layer forming a membrane covering a central region of the cavity, the piezoelectric film layer being supported at the anchor region by a spring region, the spring region being formed from the piezoelectric film layer, and an electrode disposed over the piezoelectric film layer.

11. The device of claim 10 wherein the spring region includes at least two slits and at least one join.

12. The device of claim 11 wherein the at least two slits are polygonal.

13. The device of claim 11 wherein the at least two slits are cross shaped.

14. The device of claim 10 wherein the spring region includes a plurality of zig zag portions.

15. A piezoelectric microelectromechanical systems microphone, comprising:
   a substrate including at least one wall defining a cavity, the at least one wall defining an anchor region;
   a piezoelectric film layer forming a membrane, the piezoelectric film layer being supported at the anchor region by a spring region, the spring region including at least two slits and at least one join, the at least two slits including a plurality of radially extending slits and a plurality of circumferentially extending slits extending from each side of each of the plurality of radially extending slits; and
   an electrode disposed over the piezoelectric film layer.

16. The microphone of claim 15 wherein the plurality of circumferentially extending slits extending from a first side of a first of the plurality of radially extending slits interleave with the plurality of circumferentially extending slits extending from a side of a second of the plurality of radially extending slits that is adjacent to the first of the plurality of radially extending slits.

17. The microphone of claim 16 wherein the plurality of circumferentially extending slits extending from a second side of the first of the plurality of radially extending slits interleave with the plurality of circumferentially extending slits extending from a side of a third of the plurality of radially extending slits that is adjacent to the first of the plurality of radially extending slits on an opposite side of the first of the plurality of radially extending slits from the second of the plurality of radially extending slits.

* * * * *